United States Patent
Lee et al.

(10) Patent No.: US 8,422,465 B2
(45) Date of Patent: Apr. 16, 2013

(54) TRANSMITTER AND RECEIVER FOR HIGH THROUGHPUT WIRELESS COMMUNICATION SYSTEM USING MULTIPLE ANTENNA, METHOD THEREOF, AND DIGITAL INTERMEDIATE FREQUENCY TRANSMISSION SIGNAL PROCESSING METHOD FOR THE SAME

(75) Inventors: Il-Gu Lee, Seoul (KR); Hun-Sik Kang, Daejon (KR); Minho Cheong, Daejon (KR); Yoo-Seung Song, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 907 days.

(21) Appl. No.: 12/241,921

(22) Filed: Sep. 30, 2008

(65) Prior Publication Data
US 2009/0154427 A1    Jun. 18, 2009

(30) Foreign Application Priority Data

Dec. 17, 2007   (KR) ........................ 10-2007-0132007
Dec. 18, 2007   (KR) ........................ 10-2007-0133322
Apr. 22, 2008   (KR) ........................ 10-2008-0037322

(51) Int. Cl.
  H04B 7/216   (2006.01)
  H04B 1/38    (2006.01)
(52) U.S. Cl.
  USPC ........................................ 370/335; 375/220
(58) Field of Classification Search ................. 370/334, 370/335
  See application file for complete search history.

(56) References Cited

U.S. PATENT DOCUMENTS

| 7,233,773 | B2 * | 6/2007 | Hansen et al. ................... 455/69 |
| 7,269,430 | B2 * | 9/2007 | Moorti et al. .................. 455/458 |
| 2007/0206519 | A1 | 9/2007 | Hansen et al. |
| 2009/0154427 | A1 * | 6/2009 | Lee et al. ....................... 370/335 |

FOREIGN PATENT DOCUMENTS

| KR | 1020010102618 A | 11/2001 |
| KR | 100681328 B1 | 2/2007 |
| KR | 10-2007-0073606 A | 7/2007 |
| KR | 10-2006-0048243 | 9/2008 |

OTHER PUBLICATIONS

Sanghyun Woo et al., "Combined Effects of RF Impairments in the Future IEEE 802.11n WLAN Systems", Vehicular Technology Conference, 2005., VTC 2005—Spring, 2005 IEEE 61st, vol. 2, pp. 1346-1349, May 2005.

* cited by examiner

*Primary Examiner* — Derrick Ferris
*Assistant Examiner* — Majid Esmaeilian

(57) ABSTRACT

Provided are a transmitter and receiver for a high throughput wireless communication system using a multiple antenna, a method thereof, and a digital intermediate frequency (DIF) transmission signal processing method for the same. The transmitter, includes: a baseband transmitting unit for processing a transmission signal by performing a Media Access Control (MAC) protocol process on transmission data and dividing the transmission data into n band signals where n is a predetermined natural number in a physical layer process; a DIF transmitting unit for integrating transmission signals of each band transmitted from the baseband transmitting unit and outputting m channels where m is a predetermined natural number; and a Radio Frequency (RF) transmitting unit for modulating each channel signal transmitted from the DIF transmitting unit into an RF signal and emitting the signal through the multiple antenna.

12 Claims, 19 Drawing Sheets

TRANSMITTER AND RECEIVER FOR HIGH THROUGHPUT WIRELESS COMMUNICATION SYSTEM USING MULTIPLE ANTENNA, METHOD THEREOF, AND DIGITAL INTERMEDIATE FREQUENCY TRANSMISSION SIGNAL PROCESSING METHOD FOR THE SAME

CROSS-REFERENCE(S) TO RELATED APPLICATIONS

The present invention claims priority of Korean Patent Application Nos. 10-2007-0132007, 10-2007-0133322 and 10-2008-0037322, filed on Dec. 17, 2007, Dec. 18, 2007, and Apr. 22, 2008, which are incorporated herein by reference.

BACKGROUND OF THE INVENTION

1. Field of the Invention

The present invention relates to a transmitter and receiver for a high throughput wireless communication system using a multiple antenna, a method thereof, and a digital intermediate frequency (DIF) transmission signal processing method for the same; and, more particularly, to a transmitter and receiver for a high throughput wireless communication system using a multiple antenna which improves a transmission speed while lowering an error rate for using of a modulation method such as 64-Quadrature Amplitude Modulation (QAM) by dividing and processing a transmission band into a plurality of bands in order to raise signal processes and frequency efficiency on the multiple channel in a wireless communication system using the multiple antenna for high throughput data transmission, a method thereof, and a digital intermediate frequency transmission signal processing method for the same.

This work was supported by the IT R&D program for MIC/IITA [2006-S-002-02, "IMT-Advanced Radio Transmission Technology with Low Mobility"].

2. Description of Related Art

A next generation Local Area Network (LAN) provides a very high throughput multimedia service to terminals such as a laptop computer, a personal computer, and a Personal Digital Assistance (PDA) at 200 Mbps transmission speed in a region within a 100 m radius. Also, the next generation LAN provides a wireless network environment for forming a hot-spot, office networking and home networking.

Recently, wireless LAN technology is used for providing a wireless Internet service originating areas such as an airport, a hotel or a café. In particular, Republic of Korea enables forming a wireless home network at home in a format that a wired broadband subscriber network, e.g., Asymmetry Digital Subscribe Loop (ADSL), as well as a public network wireless LAN service are integrated with a wireless LAN system.

In 1999, standards of Institute of Electrical and Electronics Engineers (IEEE) 802.11b in a 2.4 GHz band and IEEE 802.11a in a 5 GHz band are established. As an 802.11b system is commercialized later, usage of the wireless LAN is activated. The wireless LAN is maintained in a personally used private network without a service provider at an early stage. Since 2002, a public network service is originated from some nations such as Republic of Korea and U.S.A and a range of the service is recently extending. As a product of 802.11a and 802.11g is introduced to the market, data of 54 Mbps are maximally transmitted.

In an IEEE 802.11n task group, a method for raising the maximum throughput of a Media Access Control (MAC) layer, which is not the throughput of the simple physical layer, by higher than 100 Mbps has been discussed. In other words, a discussion for improving throughput by simultaneously considering the physical layer and the MAC layer is in progress. In view of the physical layer, a method for improving frequency efficiency by using a multiple antenna, e.g., a Multiple Input Multiple Output (MIMO) system, a method for increasing a bandwidth, and a method for applying adaptive modulation are considered.

The MIMO system is a system which remarkably improves a data transmission speed by forming a plurality of independent fading channels by using a multiple antenna on a transmission/reception end and transmitting different signals for each transmission antenna. Accordingly, the MIMO system transmits much data without increase of the frequency.

However, there is a problem that the MIMO system is fragile to interference between symbols, which occurs in high throughput transmission, and frequency selective fading. In order to overcome this problem, an Orthogonal Frequency Division Multiple (OFDM) method is used together. The OFDM method is a modulation method which is the most proper to high throughput data transmission. In the OFDM method, one data sequence is transmitted through a subcarrier wave having a lower data throughput.

When the MIMO system is integrated with the OFDM system, the benefit of the MIMO system is employed and the shortcoming of the MIMO system is offset trough the OFDM system. The MIMO system generally has N transmission antennas and N reception antennas and a MIMO-OFDM system has a structure that OFDM technology is integrated with the above format of the MIMO system.

However, since the conventional MIMO system applies 2 or 3 transmission/reception end antennas and a bandwidth may be lower than 40 MHz, there is a shortcoming that a hundreds of Mega level transmission speed is a limit channel capacity. A Giga level wireless communication system has been discussed in a Very High Throughput (VHT) task group and a system having a larger bandwidth is required to be developed in the VHT wireless LAN technology.

SUMMARY OF THE INVENTION

An embodiment of the present invention is directed to providing a transmitter and receiver for a high throughput wireless communication system using a multiple antenna which improves a transmission speed while lowering an error rate for using of a modulation method such as 64-Quadrature Amplitude Modulation (QAM) by dividing and processing a transmission band into a plurality of bands in order to raise signal processes and frequency efficiency on the multiple channel in a wireless communication system using the multiple antenna for high throughput data transmission, and a method thereof.

Another embodiment of the present invention is directed to providing a digital intermediate frequency (DIF) transmission signal processing method used in the transmitter and receiver for the high throughput wireless communication system.

The objects of the present invention are not limited to the above-mentioned ones. Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a transmitter for a high throughput wireless communication system using a multiple antenna, including: a baseband transmitting unit for processing a transmission signal by performing a Media Access Control (MAC) protocol process on transmission data and dividing the transmission data into n band signals where n is a predetermined natural number in a physical layer process; a digital intermediate frequency (DIF) transmitting unit for integrating transmission signals of each band transmitted from the baseband transmitting unit and outputting m channels where m is a predetermined natural number; and a Radio Frequency (RF) transmitting unit for modulating each channel signal transmitted from the DIF transmitting unit into an RF signal and emitting the signal through the multiple antenna.

In accordance with another aspect of the present invention, there is provided a receiver for a high throughput wireless communication system using a multiple antenna, including: an RF receiving unit for down-converting and outputting each RF signal received through the multiple antenna; a DIF receiving unit for dividing and outputting m channel signals received from the RF receiving unit where m is a predetermined natural number into n band signals where n is a predetermined natural number; and a baseband receiving unit for receiving signals of each band divided in the DIF receiving unit and recovering data through a physical layer process, multiple signal detection and channel decoding.

In accordance with another aspect of the present invention, there is provided a method for transmitting data in a high throughput wireless communication system using a multiple antennae including: processing a signal by performing an MAC protocol process on transmission data and dividing data into n band signals where n is a predetermined natural number in a physical layer process; integrating and outputting the divided and processed transmission signals as m channel signals where m is a predetermined natural number; and modulating each channel signal into: an RF signal and emitting the signal through the multiple antenna.

In accordance with another aspect of the present invention, there is provided a method for receiving data in a high throughput wireless communication system using a multiple antenna, including: down-converting and outputting a high-frequency signal received through the multiple antenna; dividing the down-converted and outputted m channel signals where m is a predetermined natural number into n band signals where n is a predetermined natural number; and recovering data by performing a physical layer process, multiple signal detection and channel decoding on the signals of each divided band.

In accordance with another aspect of the present invention, there is provided a method for processing a DIF transmission signal in a high throughput wireless communication system using a multiple antenna, including: receiving a zero IF signal of each band divided on the basis of the first band unit from a baseband transmitting unit in charge of an MAC protocol process and a physical layer process; and integrating the zero IF signals of each band, performing a signal process of complex number modulation and gain control according to each channel, and outputting each channel signal.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
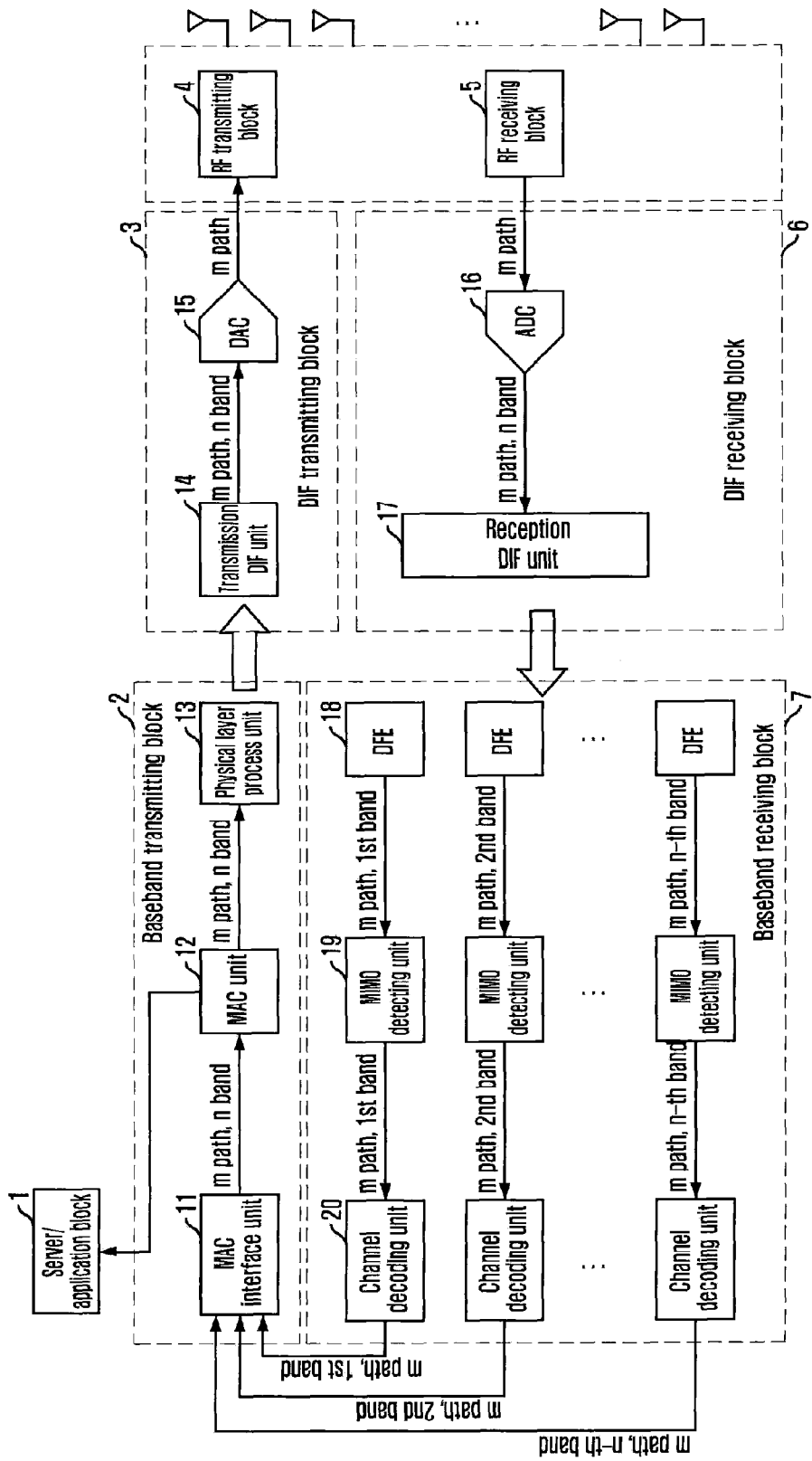
FIG. 1 is a block diagram showing an entire high throughput wireless communication system using a multiple antenna in accordance with an embodiment of the present invention.

FIG. 1 is a block diagram showing a Giga level high throughput wireless communication system using an Orthogonal Frequency Division Multiple (OFDM) method and a multiple antenna in accordance with an embodiment of the present invention.

The Giga level wireless communication system in accordance with the present invention adopts more than 8 antennas, processes divided data of 40 MHz bandwidth in a baseband receiving unit by dividing an entire transmission band into a plurality of bandwidths, e.g., 40 MHz, in a digital intermediate frequency (DIF) transmitting/receiving unit, or adding the bandwidths, and adopts a method for transmitting data at a bandwidth of an integrated 40 MHz multiple, e.g., 80 MHz or 120 MHz, in a Radio Frequency (RF) transmitting unit. In order to reduce the number pins between chips of a baseband and raise reliability of data transmission, the present invention adopts a very high throughput interface of hundreds Giga bite between the DIF transmitting/receiving unit and a baseband transmitting/receiving unit.

The high throughput wireless communication system is formed of 4 layers. That is, the present invention includes a server/application block 1, baseband transmitting and receiving blocks 2 and 7, DIF transmitting and receiving blocks 3 and 6, and RF transmitting and receiving blocks 4 and 5. The server/application block 1 displays contents of speech and image on a terminal. The baseband transmitting and receiving blocks 2 and 7 perform a process on data transmitted from the server/application block 1 and modulate the data into reliable high throughput data, or demodulate and transmit a received zero IF signal to the server/application block 1. The DIF transmitting and receiving blocks 3 and 6 receive a baseband digital signal and convert the digital signal into an analog signal, or receive an analog signal from the RF receiving block 5 and convert the analog signal into a digital signal. The RF transmitting and receiving blocks 4 and 5 perform high-frequency modulation/demodulation.

The baseband transmitting block 2 includes a Medium Access Control (MAC) unit 12, a physical layer process unit 13 and an MAC interface unit 11. The MAC unit 12 transmits speech and image data according to a communication protocol. The physical layer process unit 13 performs digital modulation in order to perform a high throughput signal process on packet data transmitted from the MAC unit 12. The MAC interface unit 11 transmits data transmitted from the baseband receiving block 7 to the MAC unit 12.

The baseband receiving block 7 includes a digital front-end (DFE) 18, a MIMO detecting unit 19 and a channel decoding unit 20. The DFE 18 receives and synchronizes a digital signal of each band, and transforms a frequency domain signal into a time domain signal through Fast Fourier Transform (FFT). The MIMO detecting unit 19 detects a symbol through QR decomposition and multidimensional detection on an output signal of the digital front-end 18. The channel decoding unit 20 recovers data by performing channel decoding on a symbol detected by the MIMO detecting unit 19. The MAC unit 12 creates a header proper to a protocol on the data transmitted from the server/application block, attaches the header in front of the data, and attaches an error correction code for error check in rear of the data. An MAC frame having the header and the error correction code is transmitted to the physical layer process unit 13.

Generally, the physical layer process unit 13 includes a scrambler, a channel coder, an interleaver, an Inverse Fast Fourier Transformer (IFFT), a modulator and a filter. The scrambler scrambles data patterns to reduce errors caused by Peak to Average Power Ratio (PAPR). The channel coder recovers an error occurring in a channel. The interleaver reduces consecutive errors. The Inverse Fast Fourier Transformer efficiently transmits data at high-speed. The modulator improves a data transmission speed. The physical layer process unit 13 transmits a signal modulated according to the OFDM method to the transmission DIF unit 14.

The transmission DIF unit 14 receives a zero IF signal divided into a plurality of band signals, e.g., a 40 MHz bandwidth, through a very high throughput interface from the physical layer process unit 13, integrates the zero IF signals of each band, and modulates the zero IF signals into a plurality of channels. The transmission DIF unit 14 modulates the zero IF signal into a low IF signal. A detailed operation of the transmission DIF unit 14 will be described hereinafter with reference to FIG. 3. A digital-to-analog converter (DAC) 15 converts the digital signal modulated into each channel by the transmission DIF unit 14 into an analog signal and transmits the analog signal to the RF transmitting block 4.

The RF transmitting block 4 modulates the analog signal received from the DAC 15 into a high-frequency band signal and emits the high-frequency band signal through an antenna.

The RF receiving block 5 down-converts the signal received through the multiple antennas into a zero IF signal, i.e., a baseband signal. A method for directly converting the received high-frequency band signal into a zero IF signal without a procedure of converting the high-frequency band signal into an IF signal in order to simplify the structure of the RF receiving block.

An analog-to-digital converter (ADC) 16 converts the analog zero IF signal of each channel received from the RF receiving block 5 into a digital signal and provides the digital signal to a reception DIF unit 17.

The reception DIF unit 17 divides the zero IF signal received as a multiple of a 40 MHz band into a plurality of 40 MHz band signals and provides the signals divided according to each band to the digital front-end through a high throughput interface. A detailed operation of the reception DIF unit 17 will be described hereinafter with reference to FIG. 4.

The digital front-end 18 performs a physical layer process for performing a gain control and synchronization procedure and a FFT procedure on the signals of each band transmitted from the reception DIF unit 17. That is, the digital front-end 18 removes a DC component generated on board, compensates gain or phase offset of a Q channel at a reference of an I channel value, and synchronizes a symbol through correlation between short and long preambles. The digital front-end 18 corrects frequency offset through the phase offset acquired by the long preamble and converts a frequency domain signal into a time domain signal through FFT. The digital front-end 18 compensates phase offset estimated based on a pilot signal and compensates a signal distorted by a channel by equalizing data acquired through FFT with a channel estimate estimated by the long preamble.

The MIMO detecting unit 19 detects a symbol from the signal received according to each band from the digital front-end 18 through QR decomposition and multidimensional detection. The channel decoding unit 20 recovers data by performing channel decoding on the symbol detected by the MIMO detecting unit 19.

When it is checked that there is no error in the signal received through an error correction code detector, the recovered data packet is transmitted to the MAC unit 12 through the MAC interface unit 11. The MAC unit 12 extracts header information and transmits data received in the server/application block 1.

Figure 2:
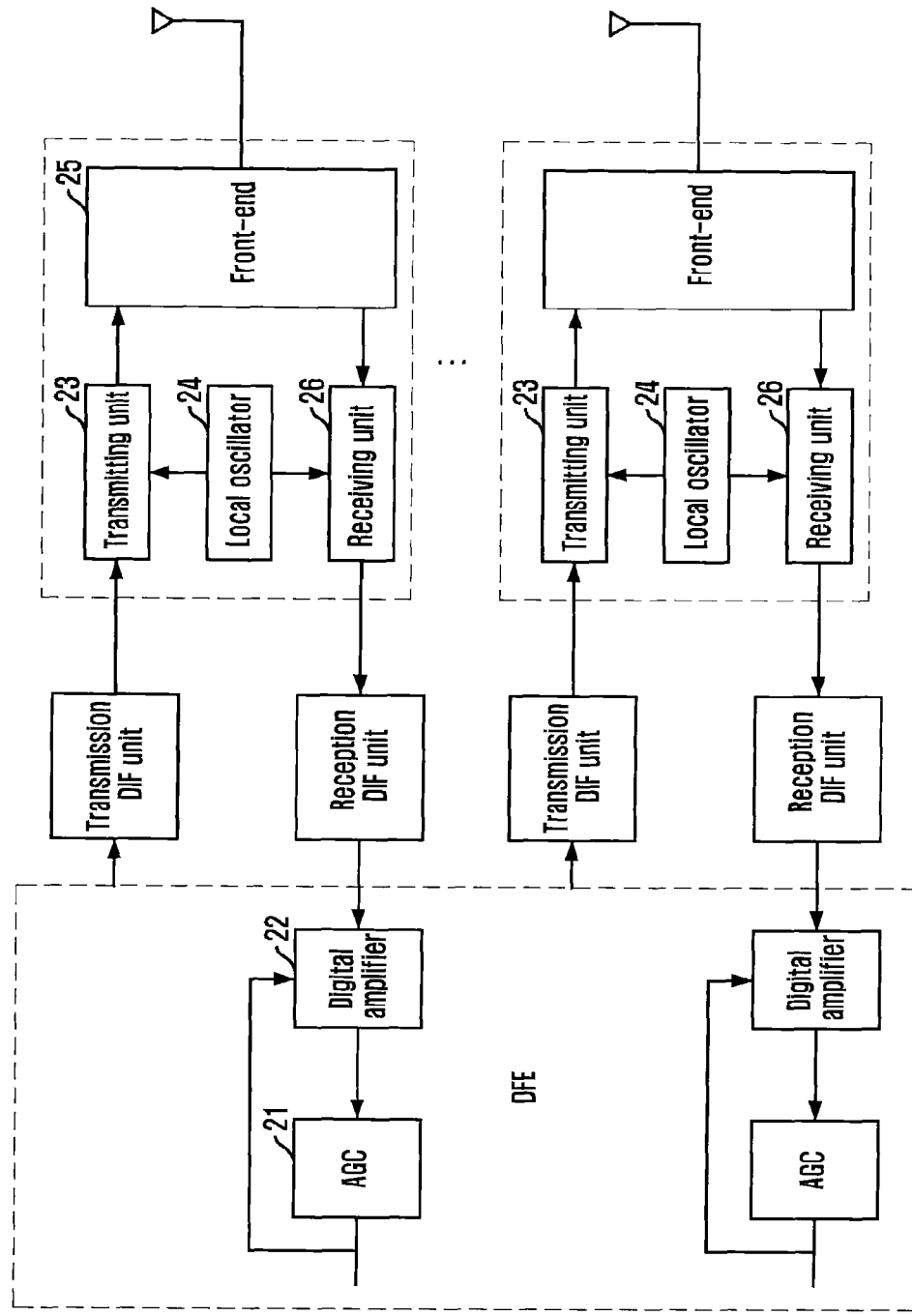
FIG. 2 is a block diagram illustrating Radio Frequency (RF) transmitting block and a digital front-end (DFE) of FIG. 1.

FIG. 2 is a block diagram illustrating the RF transmitting/receiving blocks of FIG. 1 and shows configurations of a digital amplifier and an automatic gain controller (AGC) inside the digital front-end.

The RF receiving block down-converts a high-frequency signal received through an antenna into a zero IF signal having a 0 Hz center frequency and transmits the high-frequency signal to the reception DIF unit 17. The reception DIF unit 17 receives the signal down-converted into the zero IF signal, converts the signal into a digital signal, divides a 40 MHz multiple band signal into 40 MHz band signals, and provides the 40 MHz band signals to the digital front-end 18.

The digital front-end includes an AGC 21 and a digital amplifier 22. The digital front-end receives a digital input signal in an enough dynamic range and controls a level of the digital input signal by a target voltage level satisfying a bit range required in a modem. The AGC 21 of the digital front-end performs the above function and an arrival distance of a wireless communication system is determined by how many bits margin is to be set up. For example, when 10 bits are required for performance of the modem, it is possible to reduce a signal size larger than 10 bits in the digital amplifier 22 and amplify a signal size smaller than 10 bits by 10 bits by using a 14 bits ADC. In other words, the AGC 21 controls the digital amplifier to satisfy the bit range required in the modem.

The RF transmitting/receiving blocks include a front-end 25, a transmitting unit 23, a receiving unit 26 and a local oscillator 24. The front-end 25 includes a power amplifier (PA), a radio frequency switch (RFSW) and a low noise amplifier (LNA). The power amplifier is connected to the transmitting unit 23 and amplifies an output signal of the transmitting unit 23 by a system output level. The radio frequency switch receives a control signal from the modem and connects one route among transmission/reception routes of a high-frequency RF module to the antenna according to the control signal. The low noise amplifier performs low noise amplification on a reception signal connected to the antenna and received from the antenna and lowers a noise level of the receiver.

The transmitting unit 23 includes an IF band-pass filter (BPF), an RF mixer and an RF BPF. The IF BPF limits a signal bandwidth on the output signal of the modem and removes spurious generated in a modulation procedure. The RF mixer converts an IF band signal into an RF band signal, which is a system output signal frequency band. The RF BPF outputs only a requirement band signal by removing the spurious generated in the RF mixer.

The receiving unit 26 includes an RF BPF, an RF mixer and an IF BPF. The RF BPF limits the band such that only the requirement band signal among the LNA output signals of the front-end 25 can be transmitted to the receiver. The RF mixer converts an RF band signal into an IF band signal. The IF BPF removes spurious generated in the RF mixer.

The local oscillator 24 includes phase locked loop (PLL), an IF voltage control oscillator (VCO) and an RF VCO. The PLL receives a reference clock and a PLL control signal through Back Plane and selects frequencies of the IF VCO and the RF VCO. The IF VCO and the RF VCO are connected to the PLL, generates a signal corresponding to local oscillating frequencies of the IF and the RF, and transmits the signal to the transmitting and receiving units.

Figure 3:
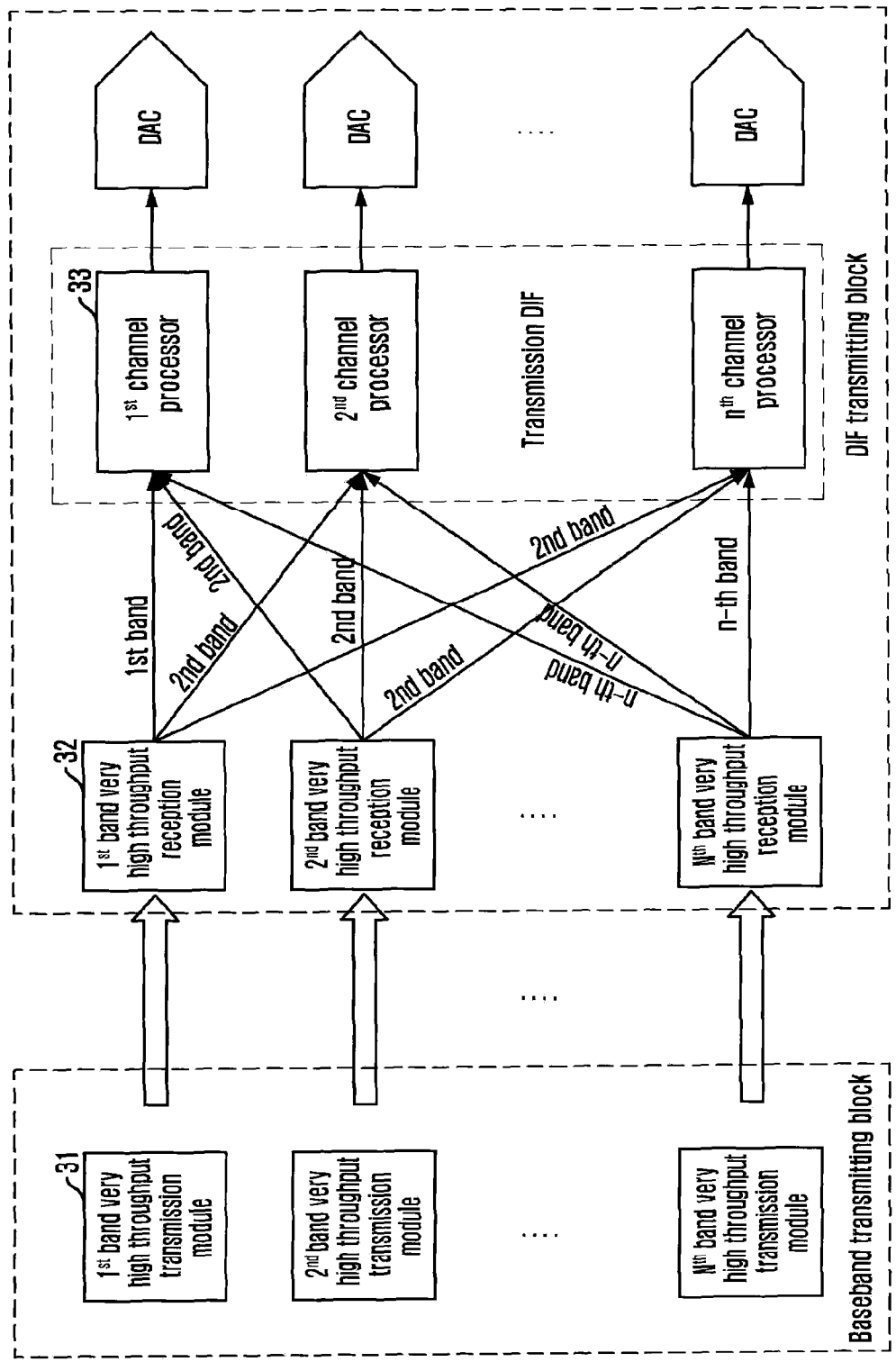
FIG. 3 is a block diagram showing a signal process between a baseband transmitting block and a digital intermediate frequency (DIF) transmitting unit in accordance with an embodiment of the present invention.
Figure 4:
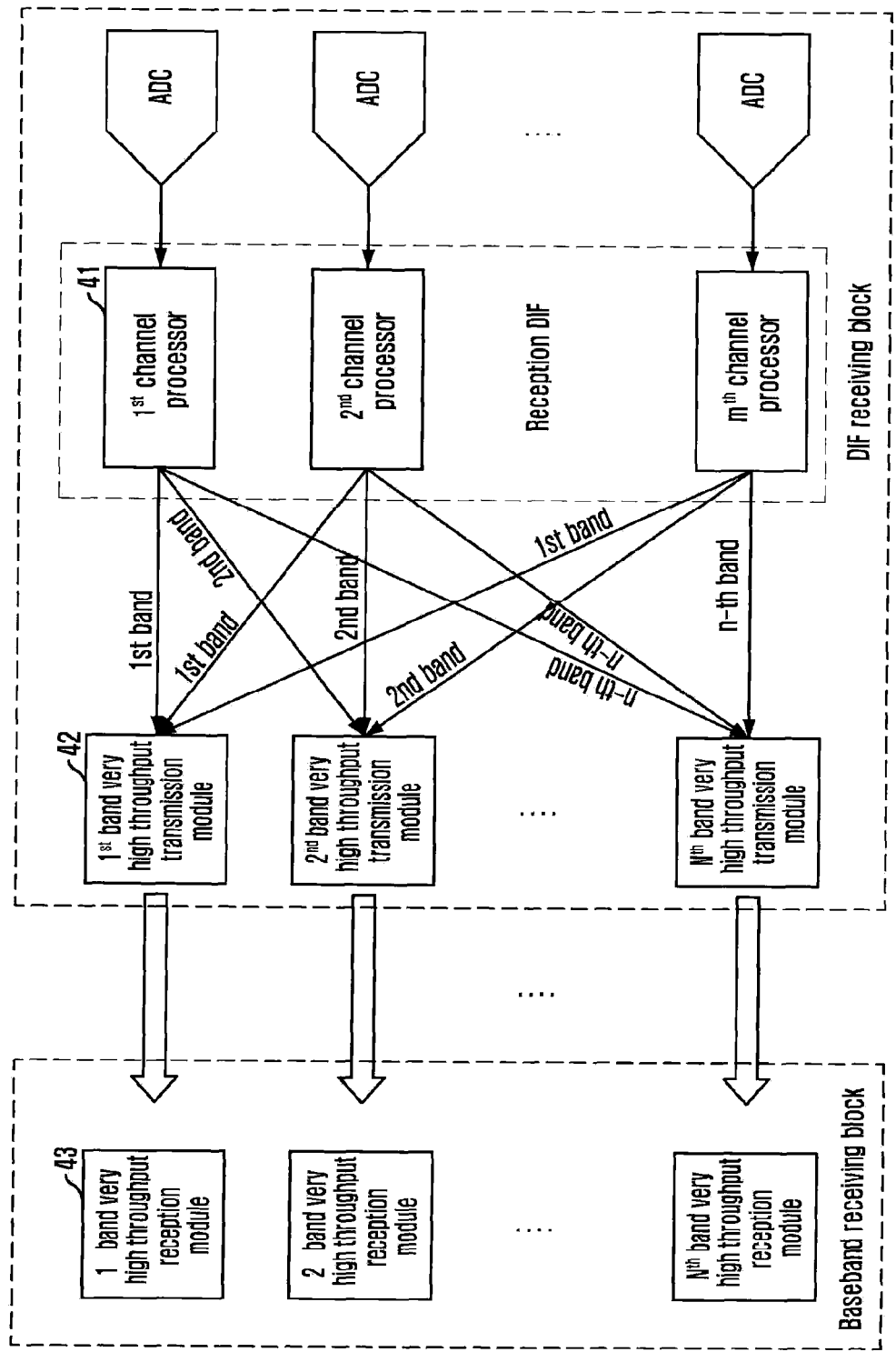
FIG. 4 is a block diagram showing a signal process between a DIF receiving unit and a baseband receiving unit in accordance with an embodiment of the present invention.

FIG. 3 is a block diagram showing a signal transmitting procedure between a baseband transmitting block and a DIF transmitting unit in accordance with an embodiment of the present invention. FIG. 4 is a block diagram showing a signal transmitting procedure between a DIF receiving unit and a baseband receiving unit in accordance with an embodiment of the present invention.

When the high throughput wireless communication system has m transmission antennas and m reception antennas, the present invention is designed to perform a signal process in the DIF unit at a low clock after dividing a signal into signals of n bands. For example, a case that the high throughput wireless communication system is designed to have 8 transmission antennas and 8 reception antennas for high throughput data transmission and have a 120 MHz bandwidth will be described. In this case, the results are m=8 and n=3. When the DAC adopts 12 bits and the ADC adopts 14 bits, a transmitting end has a speed of 40 MHz(operation speed)×12 bits×2 (I/Q)×3(band)×8(antenna number)=23.04 Gbps and has a transmission speed of a 7.68 Gbps level according to each band. A receiving end has a speed of 40 MHz(operation speed)×14 bits×2(I/Q)×3(band)×8(antenna number)=26.88 Gbps and has a transmission speed of a 8.96 Gbps level according to each band.

Referring to FIG. 3, the physical layer process unit of the baseband transmitting block receives channels I and Q data of m number having a low throughput operation frequency, e.g., 40 MHz, in a format of Low Voltage Transistor Transistor Logic (LVTTL) from the MAC. Subsequently, the physical layer process unit transmits the channels I and Q data to a very high throughput reception module 32 of the transmission DIF unit through a very high throughput transmission module 31 possessed according to each of n bands. Each of the very high throughput reception modules 32 possessed according to each of n bands transmits the signal transmitted from the baseband transmitting block to m channel processors 33. Each of the m channel processors 33 integrates signals of each band received from the n very high throughput reception modules 32, performs a signal process such as complex number modulation and gain control on the signals, and outputs the signals through the DAC.

Referring to FIG. 4, digital signals received through the ADC are inputted to each of m channel processors 41. Each channel processor 41 performs a signal process such as filtering, demodulation and gain control on the inputted signals according to each channel, and transmits the signals to n very high throughput transmission modules 42. Each of the n very high throughput transmission modules 42 divides an entire transmission band transmitted from the m channel processors 41 according to each band, and transmits each band to n very high throughput reception modules 43 of the baseband receiving unit.

Figure 5:
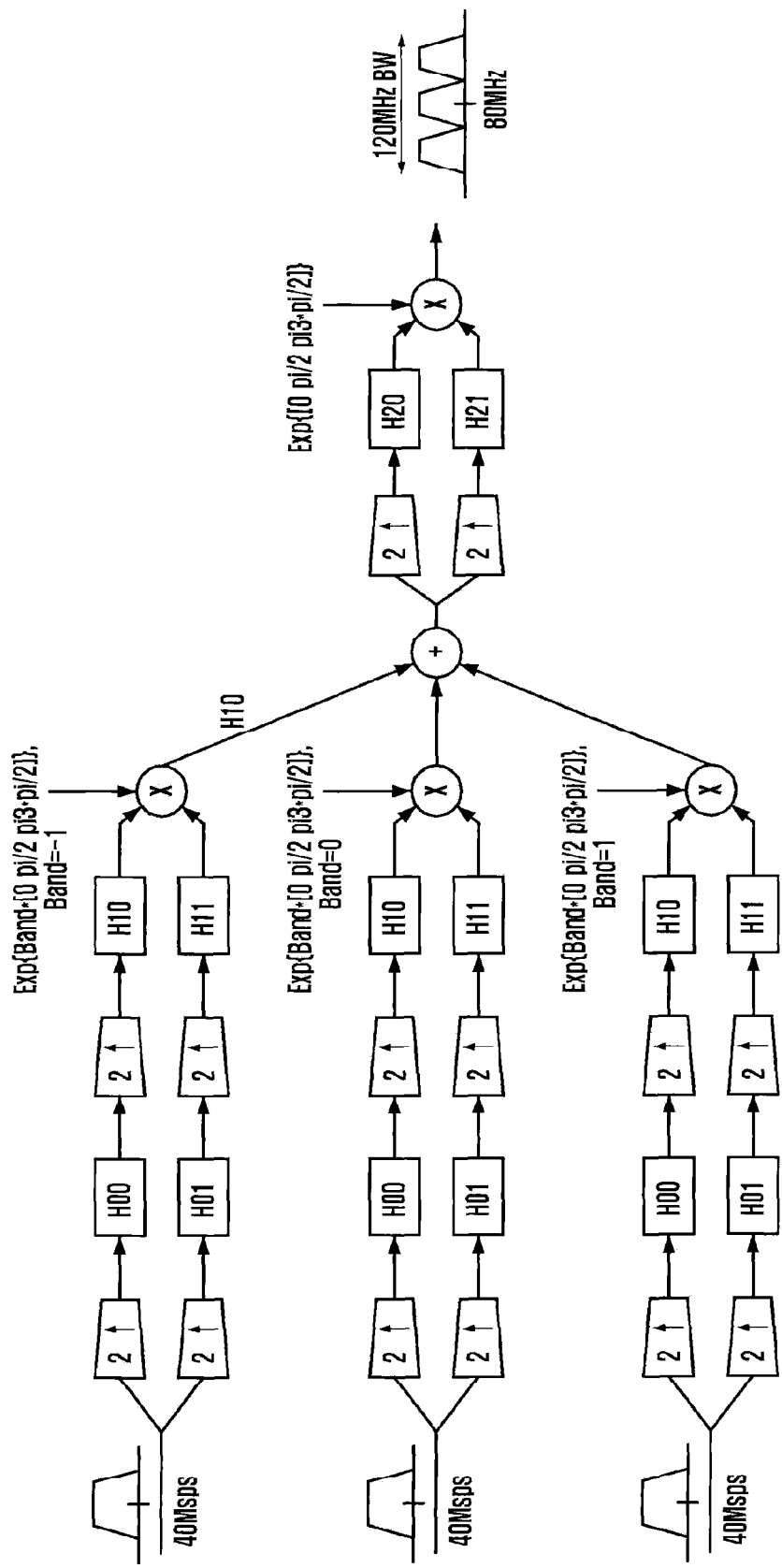
FIG. 5 is a diagram showing a frequency conversion procedure of each band signal of a 40 MHz unit in accordance with an embodiment of the present invention.

FIG. 5 is a diagram showing a frequency conversion filter of each band including 40 MHz units inside Field Programmable Gate Array (FPGA) in accordance with an embodiment of the present invention. FIG. 5 shows a DIF operation.

When 40 Mbps signals of the channels I and Q are received from the baseband transmitting block, a frequency conversion function is performed on each band by using a filter according to each procedure. Outputs of each band are added to final filter data and a summation result is outputted at a desired band through the DAC. Subsequently, power of the outputted signal of the DAC is controlled precisely. FIG. 5 shows a filter structure of the transmitting end in case of a structure that a band of an 120 MHz bandwidth is divided into 3 bands of 40 MHz bandwidth and processed in a baseband.

Figure 6:
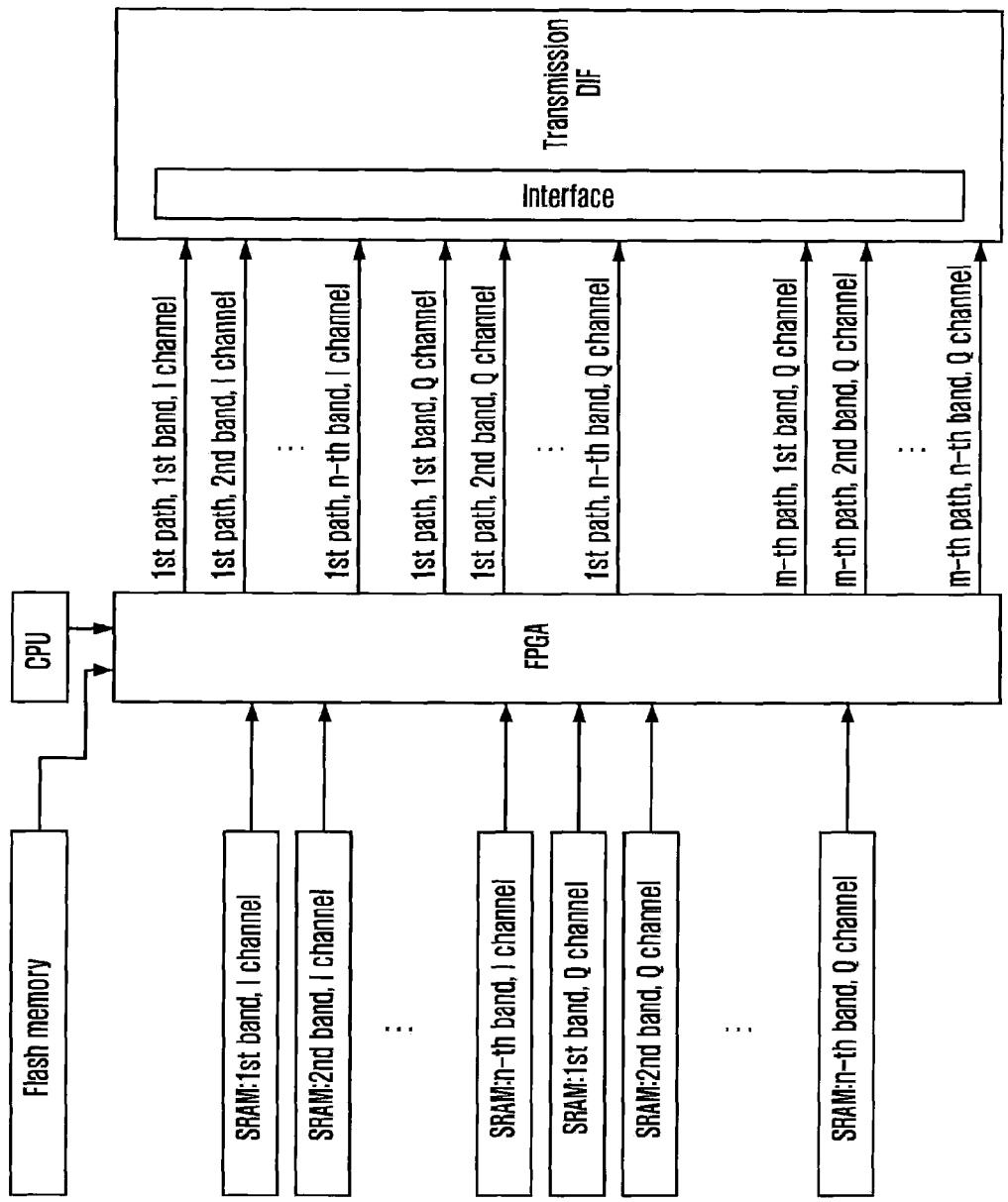
FIGS. 6 and 7 show a board for loop back test for testing the DIF unit in accordance with an embodiment of the present invention.
Figure 7:
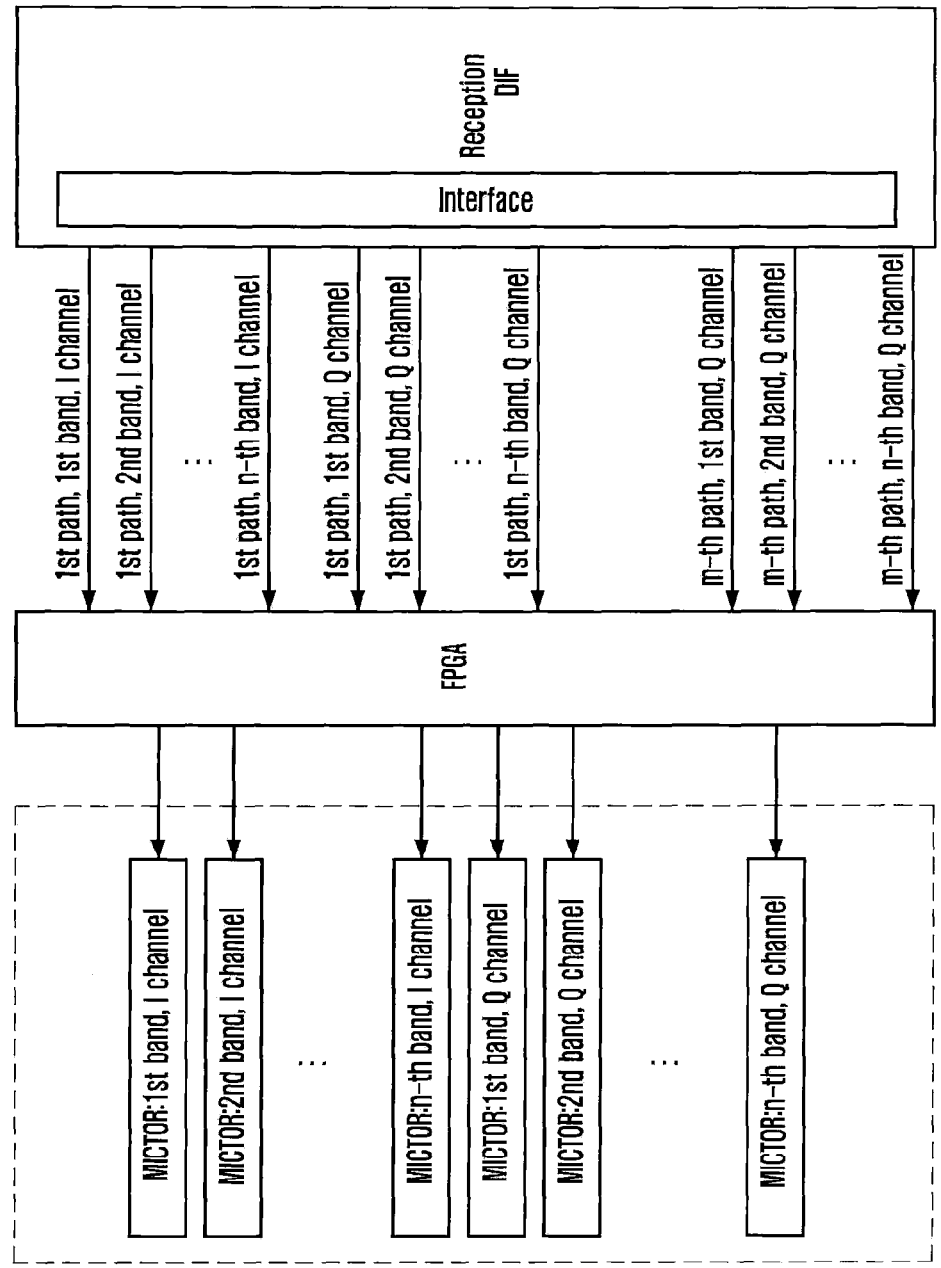

As described above, verification should be considered since designing of the structure to design and efficiently verify the very high throughput wireless communication system adopting the multiple antennas and the OFDM method. FIGS. 6 and 7 show a board for loop back test for testing the DIF unit of the very high throughput wireless communication system in accordance with an embodiment of the present invention. The board for loop back test shown in FIGS. 6 and 7 is for testing operation and performance of the transmission and reception DIF units.

In order to test the transmission DIF unit, test data are stored in a flash memory. After power is supplied, the test data are transmitted to the FPGA through Static Random Access Memory (SRAM) possessed in each channel of each band. The FPGA performs a signal process on the data received from the SRAM according to the procedure used in the baseband transmitting block and inputs the data in the transmission DIF unit according to each channel of each band. Central Processing Unit (CPU) respectively controls the flash memory and the SRAM and controls the FPGA for test.

In order to test the reception DIF unit, the output of the transmission DIF unit is connected to the input of the reception DIF unit and the data transmitted from the transmission DIF unit are received in the reception DIF unit. The process signal of the reception DIF unit is inputted in the FPGA and a logic analyzer is connected to a matched impedance connector (MICTOR) connected to the FPGA. Accordingly, the received signal is watched by using the logic analyzer.

Also, when the board for loop back test in accordance with the present invention cooperates with the RF transmitting/receiving blocks, the board for loop back test is used for testing performance and functions of the RF transmitting/receiving blocks. That is, the test data generated in a transmission DIF memory is modulated into a low IF signal, converted into an analog signal again and transmitted to the RF transmitting unit. The RF transmitting unit modulates the analog signal into a high-frequency signal and emits the signal through the antenna. The signal distorted through the radio channel is inputted through the receiving end antenna and the RF receiving block down-converts and demodulates the received signal into a zero IF signal. The reception DIF divides the zero IF signal into band signals, which are operable at a low frequency, and performs digital conversion. Distortion of a transmission DIF unit, a transmission RF unit, a reception RF unit, a reception DIF unit is observed by storing the digital-converted signal in the FPGA and analyzing the signal by using the logic analyzer. A test of the receiving end should proceed by using a signal generator in analyzing both of transmission and reception.

Figure 8:
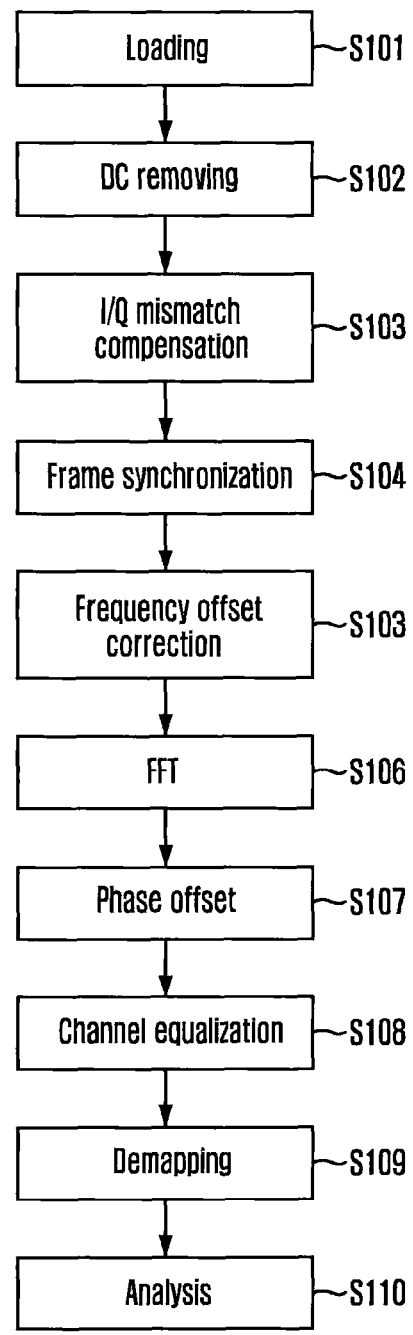
FIG. 8 shows a process of analyzing a reception signal on computer by using the logic analyzer connected to a matched impedance connector (MICTOR).

FIG. 8 shows a process of analyzing a reception signal on computer by using the logic analyzer connected to the MICTOR. The process is similar to the process in the digital front-end.

A signal converted into a digital signal through the transmission and reception DIF units is stored in a text file or an excel file. An error value of the signal finally corrected by applying a compensation algorithm in stages is calculated in order to determine how much the received signal is distorted.

When the process is sequentially described, result data of the stored file are read at step S101. A DC component generated on board is removed at step S102. I/Q mismatch compensation is performed on a gain or phase offset of the Q channel at a reference of an I channel value at step S103. Symbol synchronization is performed on the frame through correlation between short and long preambles at step S104 and frequency offset is corrected by phase offset acquired by the long preamble at step S105.

A frequency domain signal is converted into a time domain signal through FFT at step S106 after frequency offset correction and phase offset is compensated based on a pilot signal at step S107. A signal distorted by a channel is compensated by equalizing data acquired through FFT with a channel estimate estimated by the long preamble at step S108. The distortion-compensated signal is recovered as a bit sequence according to a modulation signal mode at step S109. A distortion level of a signal is calculated as Error Vector Magnitude (EVM) at step S110 and a difference between an ideal signal and the distorted signal is outputted on the average. Also, Eigen Value Spread (EVS) value is acquired by a channel estimation result using the long preamble. Correlation of multiple antenna arrangement is acquired by the EVS value. It is also possible to estimate a level of offset which is not compensated although compensation is performed based on modem algorithm.

FIG. 9 shows an entire format and a recovery result of a reception signal.

Figure 9A:
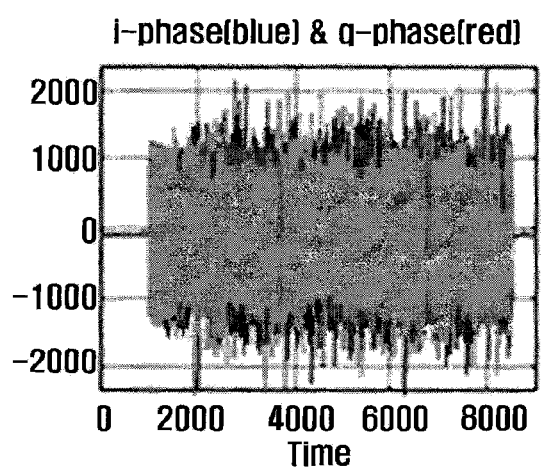
FIGS. 9A to 9H show an entire format and a recovery result of a reception signal.
Figure 9B:
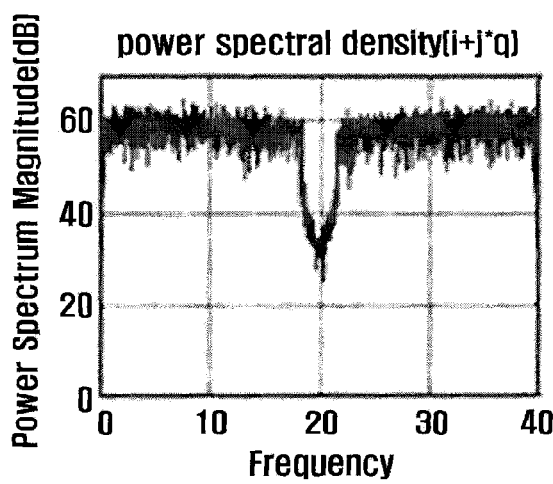
Figure 9C:
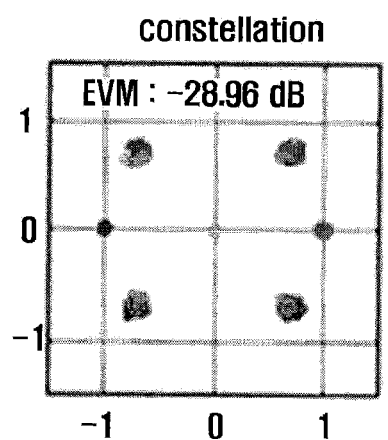
Figure 9D:
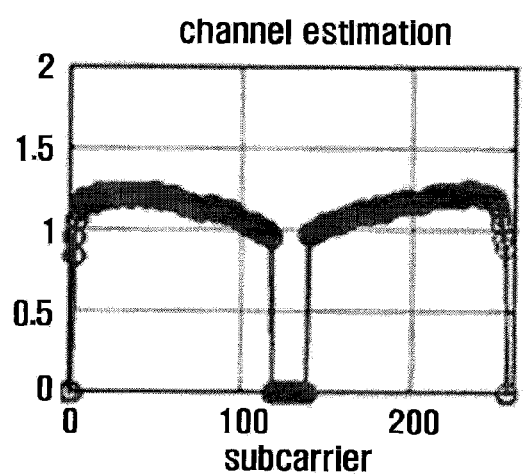
Figure 9E:
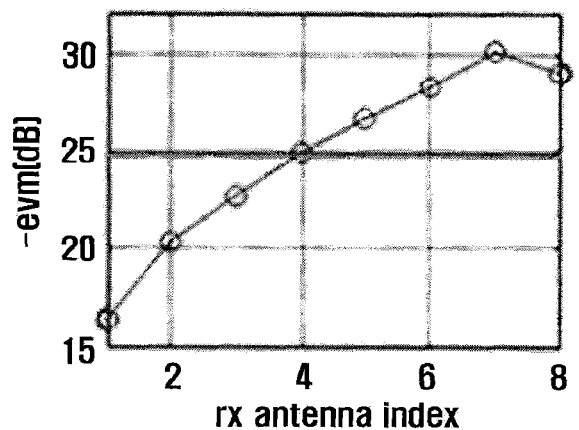
Figure 9F:
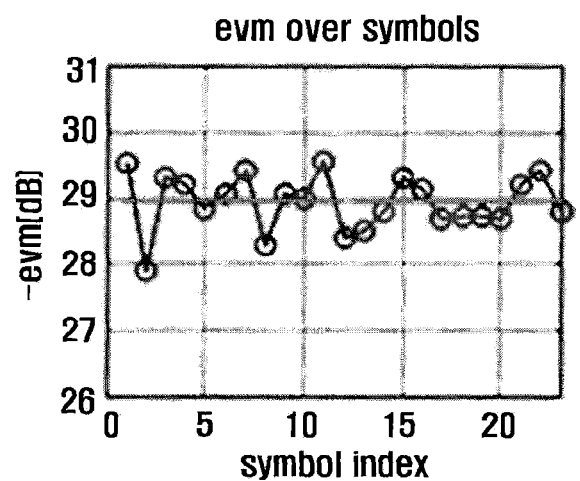
Figure 9G:
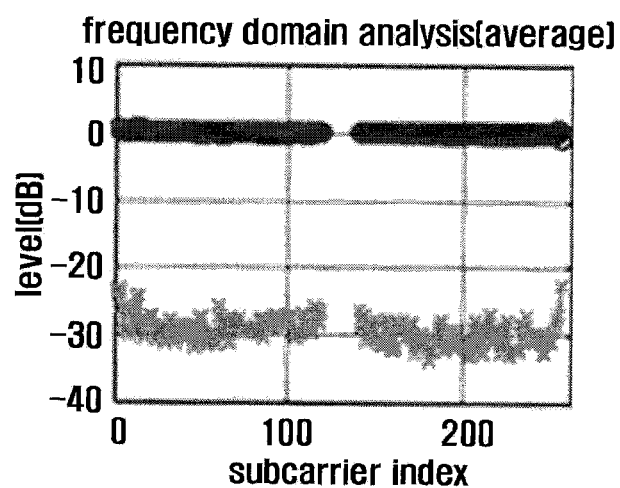
Figure 9H:
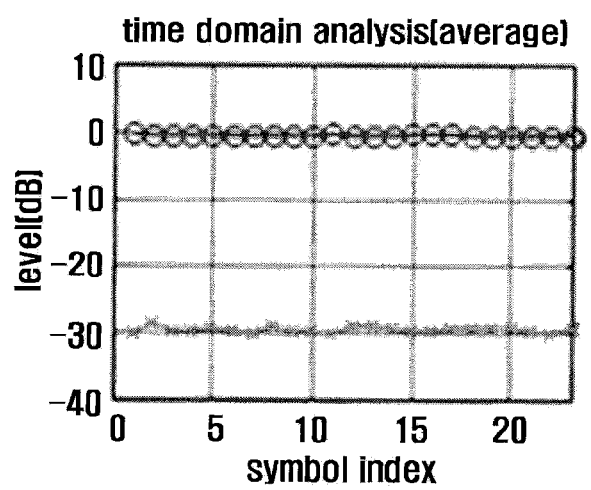

FIG. 9A shows a size of I and Q channels in a time domain. FIG. 9B shows a power density of a complex signal and FIG. 9C shows constellation of a finally recovered signal. As a result, EVM performance of −29 dB is acquired by distortion of the transmitting/receiving end. FIG. 9D shows a channel estimate acquired by the long preamble for channel estimation. FIG. 9E is a distribution chart of the EVM according to each reception antenna and shows at example of 8 multiple antennas. FIG. 9F shows EVM values according to each symbol of a specific antenna. FIG. 9G shows signal-to-noise ratio (SNR) in a frequency domain and FIG. 9H shows SNR in a time domain.

Figure 10A:
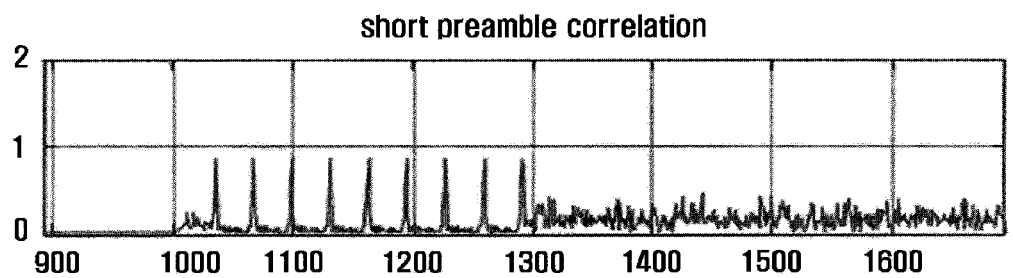
FIGS. 10A to 10C show correlation of a preamble for symbol synchronization.
Figure 10B:
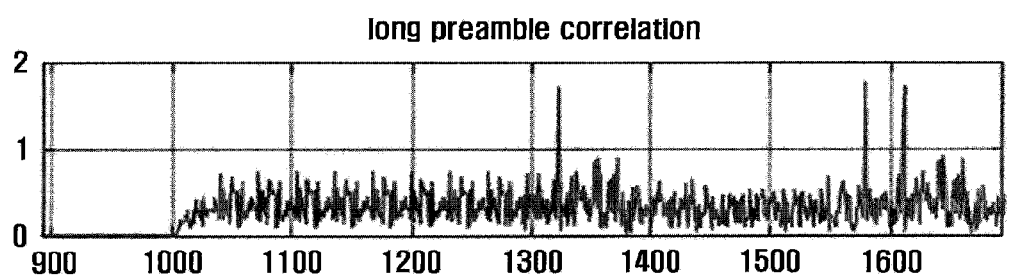
Figure 10C:
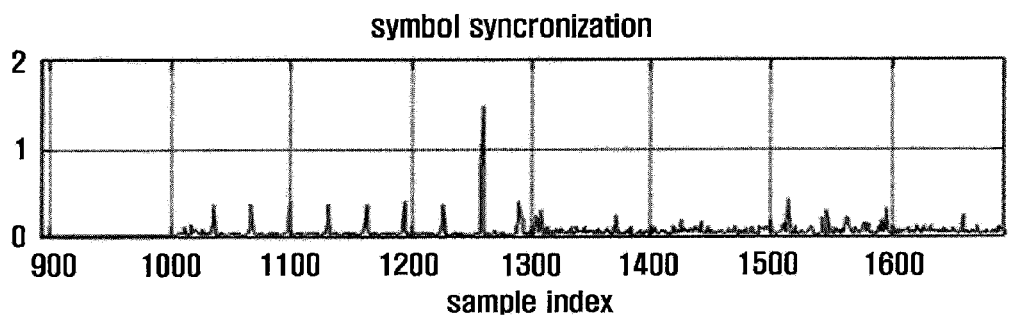
Figure 11A:
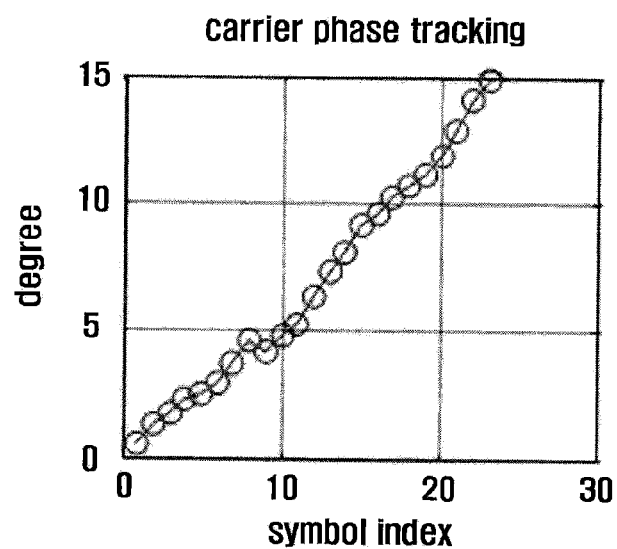
FIGS. 11A to 11D show tracking results of a carrier wave phase, a sampling phase, amplitude and frequency offset.
Figure 11B:
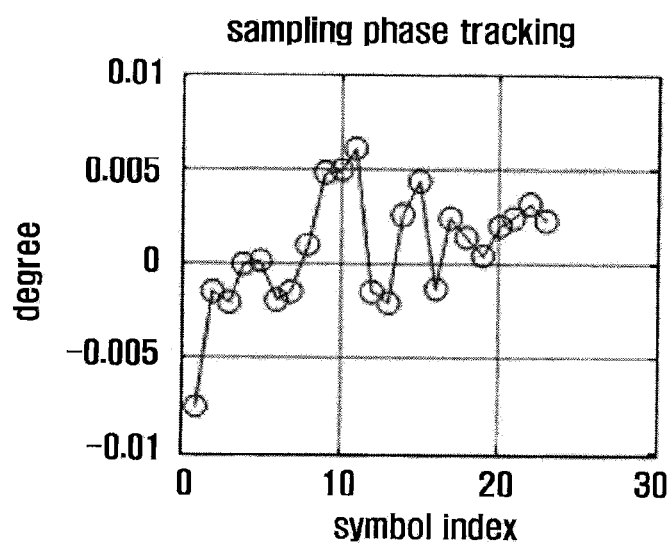
Figure 11C:
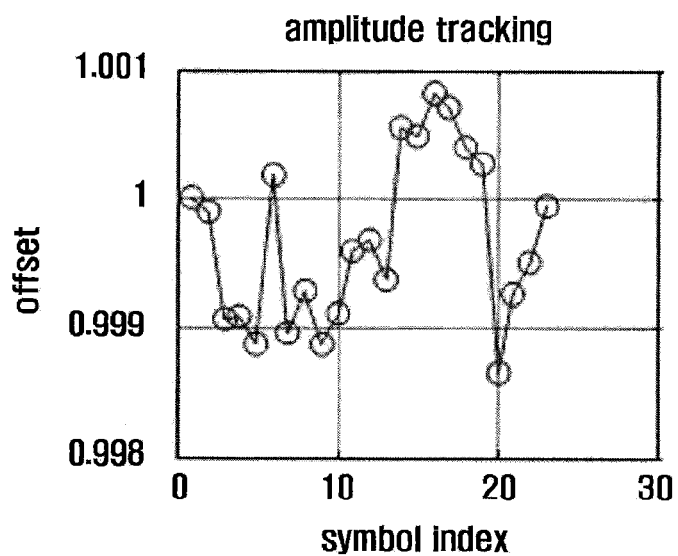
Figure 11D:
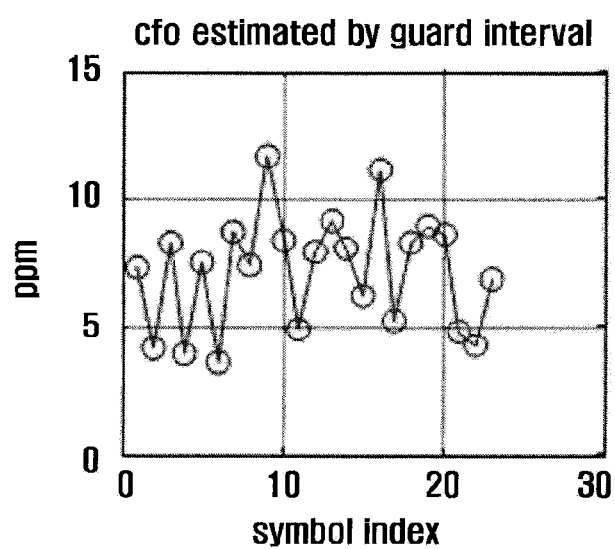

FIG. 10 shows correlation of a preamble for symbol synchronization. FIG. 10A shows correlation of the short preamble and FIG. 10B shows correlation of the long preamble. FIG. 10C shows multiplication of each correlation of the short and long preambles. At this time, synchronization is performed at a point that the largest value is acquired.

FIGS. 11A, 11B, 11C and 11D show a carrier wave phase estimate, a sampling phase estimate, an amplitude estimate and a frequency offset estimate predicted by a guard interval, respectively. As describe above, verification and debugging may be performed by a level which is possible when cooperating with a modem later by acquiring and compensating an error occurring in a modulation procedure of a transmission signal, an error occurring in a demodulation procedure of a reception signal, quantization noise occurring in ADC and DAC procedures, and sampling phase noise as a quantitative value.

Figure 12:
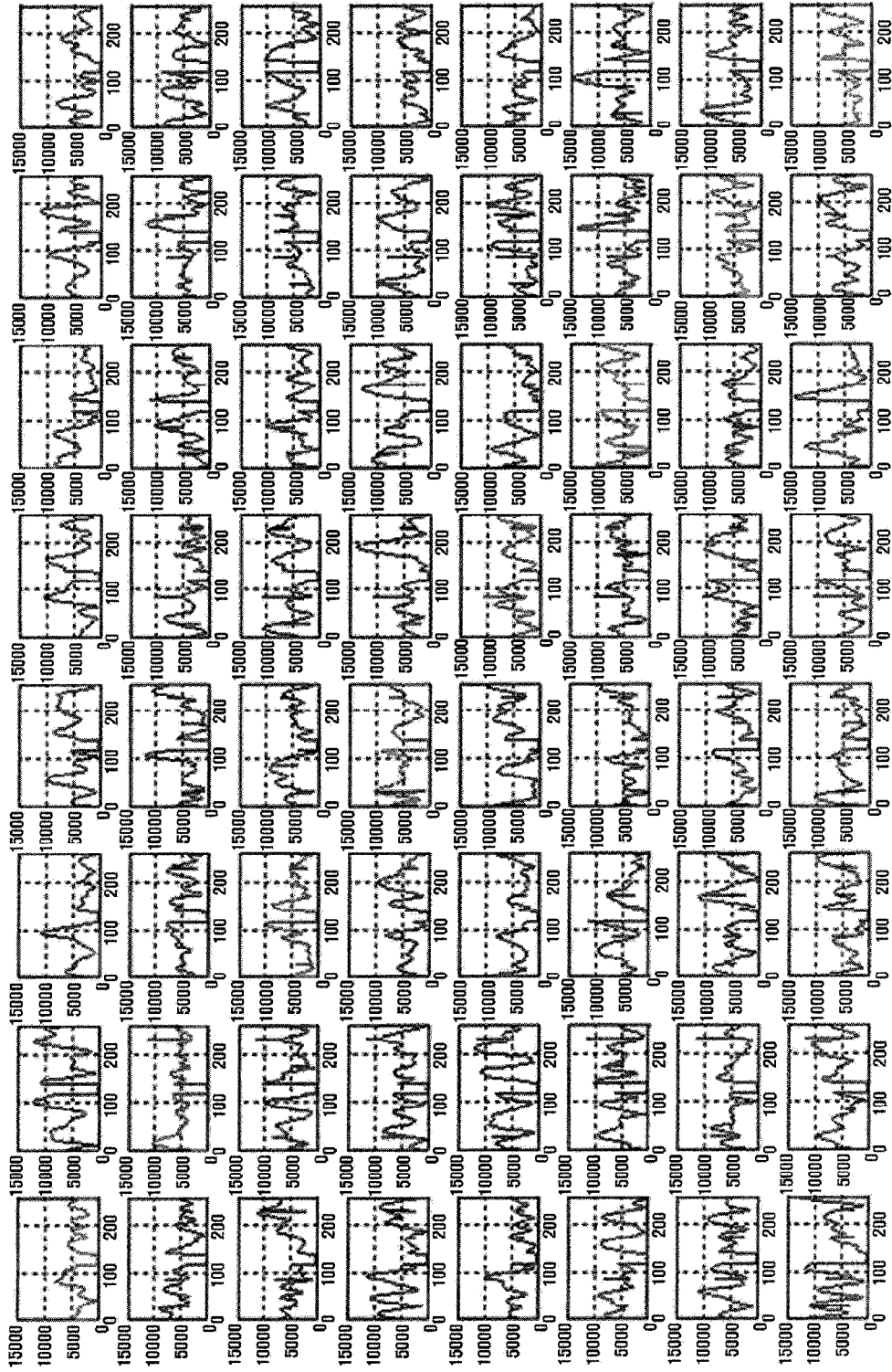
FIG. 12 shows an estimation result of a channel state by a long preamble.

FIG. 12 shows an estimation result of a channel state by the long preamble. An X axis is a receiving end antenna index and a Y axis is a time. For example, a channel state of a $4^{th}$ OFDM symbol of a $3^{rd}$ antenna is as shown in a graph which is located in (3, 4) in an 8×8 matrix. It is possible to determine based on the result whether there is an error in the transmission/reception antenna and figure out an effect according to change of a carrier wave frequency in a transmission/reception switching test. Extensively, effect between neighboring carrier waves is figured out.

FIG. 13 shows diverse channel characteristic analysis results.

Figure 13A:
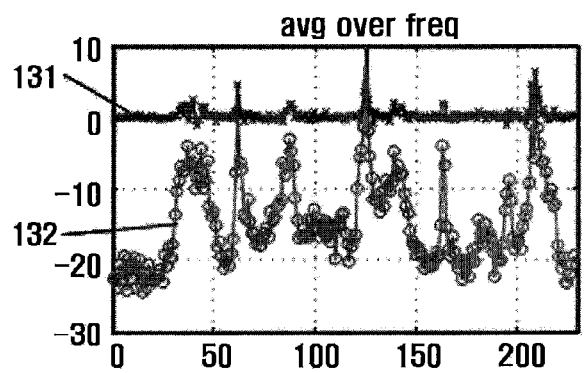
FIGS. 13A to 13I show diverse channel characteristic analysis results.
Figure 13B:
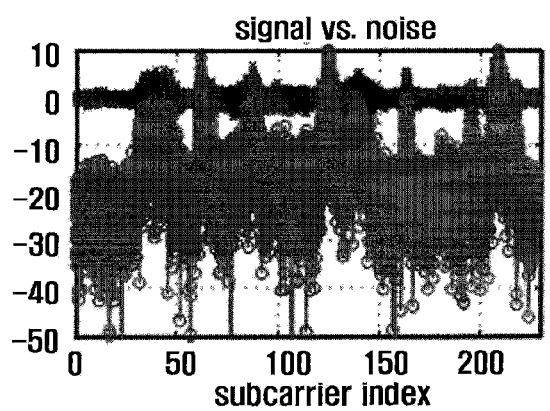
Figure 13C:
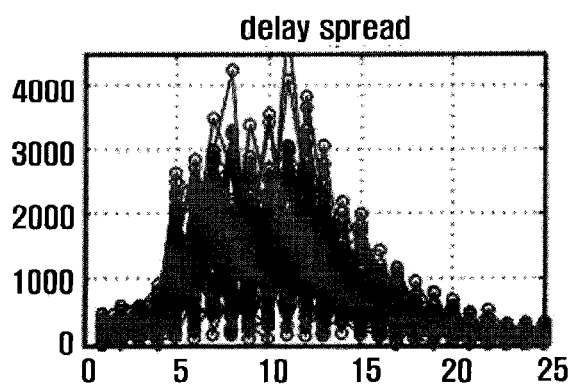
Figure 13D:
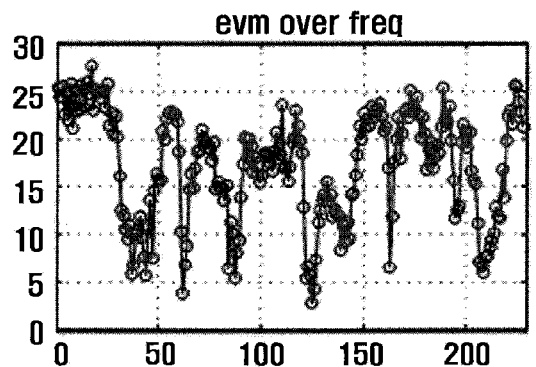

FIG. 13A shows SNR in a frequency domain. In FIG. 13A, when a reference number 131 is a signal, a reference number 132 is a noise level. A graph of FIG. 13A shows an average value in each subcarrier wave. FIG. 13B is a graph showing distribution of the entire OFDM symbols. FIG. 13C shows a calculation value of delay spread using a preamble of a signal received in each antenna route. FIG. 13D shows an EVM calculation value in the frequency domain and the EVM calculation value is matched with the noise level.

Figure 13E:
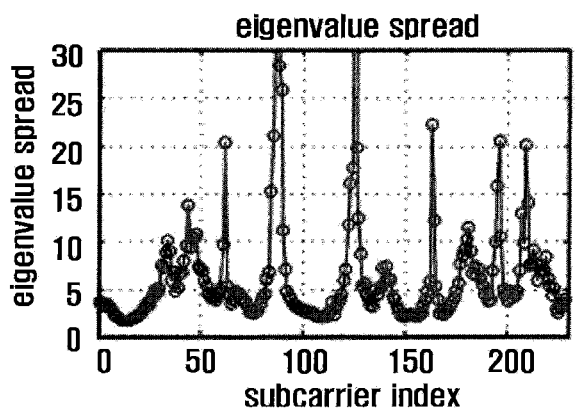
Figure 13F:
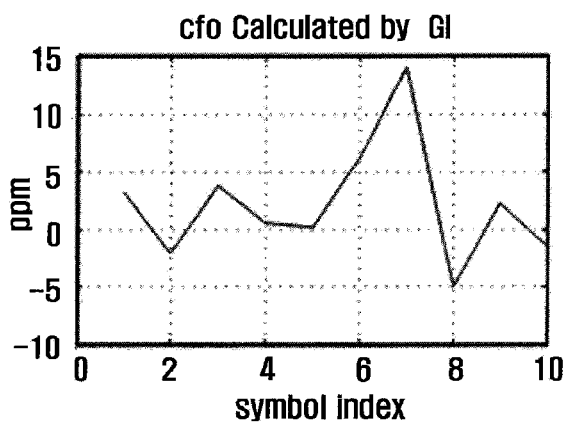
Figure 13G:
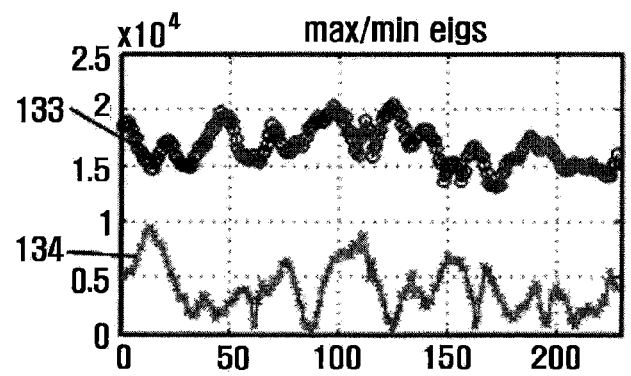
Figure 13H:
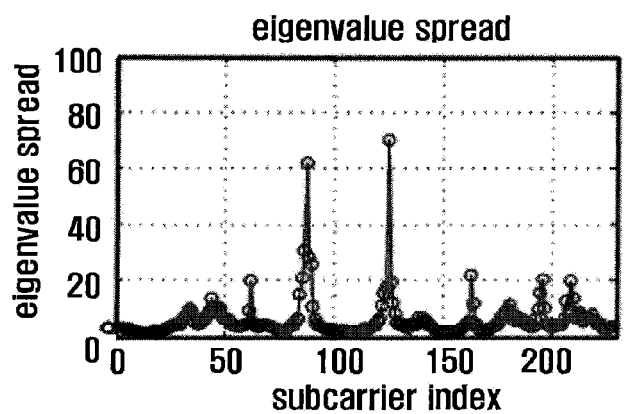
Figure 13I:
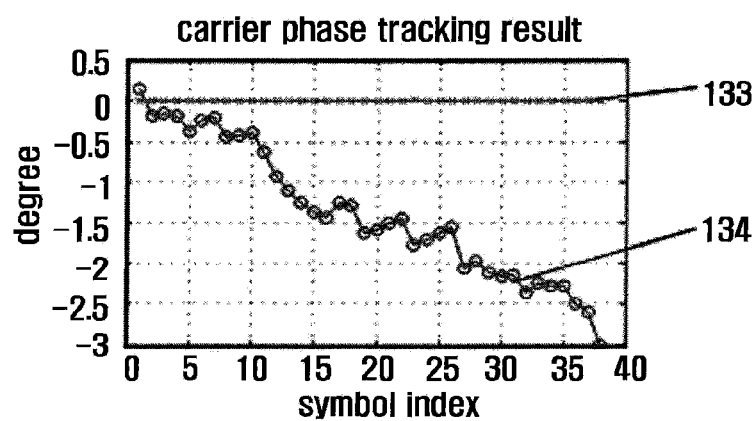

FIG. 13E is a graph showing Eigen Value Spread (EVS) and shows a subcarrier wave where higher values have larger noise. FIG. 13F shows carrier wave frequency offset acquired as a guard interval for each symbol. FIG. 13G shows a maximum eigen value 133 and a minimum eigen value 134. The Y axis of FIG. 13H is extended from the Y axis of FIG. 13E. FIG. 13I shows a phase tracking value. A reference number 135 is a timing phase and a reference number 136 is a carrier wave phase.

A pseudo code for acquiring the EVS is as follows. d is an index of a used data tone. eigs is acquired by a ratio of the maximum eigen value maxd and the minimum eigen value mind when H is a channel matrix of an 8×8 matrix. eigs is an EVS value. It is shown as follows.

```
For i=1:228,
    [V,D]=eig(H(1+(d(i)-1)*8:d(i*8,:));
    eig_val(i,:) = diag(D);
    maxd=max(abs(diag(D)));
    maxd_reg(i,:)=max(abs(diag(D)));
    mind=min(abs(diag(D)));
    mind_reg(i,:)=min(abs(diag(D)));
    eigs(i)=maxd/mind;
end
```

As described above, the present invention can remarkably increase a transmission speed by allowing the MIMO system to simultaneously transmit 8 streaming signals by using more than 8 multiple antennas, which is not realized for a while.

Also, the present invention provides a test device of an RF module for the Giga level high throughput wireless communication system using the OFDM method and the multiple antennas.

The present invention provides high definition moving picture and contents in a real-time wireless environment at home, offices or class rooms of universities.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

While the present invention has been described with respect to the specific embodiments, it will be apparent to those skilled in the art that various changes and modifications may be made without departing from the spirit and scope of the invention as defined in the following claims.

What is claimed is:

1. A transmitter for a high throughput wireless communication system using multiple antennas, comprising:
   a baseband transmitting means for processing a transmission signal by performing a Media Access Control (MAC) protocol process on transmission data and dividing the transmission data into n band signals where n is a predetermined natural number greater than one in a physical layer process, each of the n band signals having a bandwidth of a predetermined bandwidth unit and the transmission data having a bandwidth of n multiples of the predetermined bandwidth unit;
   a digital intermediate frequency (DIF) transmitting means for integrating each of the n band signals transmitted from the baseband transmitting means and outputting m channel signals where m is a predetermined natural number greater than one, each one of the m channel signals being generated by integrating every one of the n band signals and converting to an analog signal of an intermediate frequency (IF); and
   a Radio Frequency (RF) transmitting means for modulating each of the m channel signals transmitted from the DIF transmitting means into an RF signal and emitting the RF signal through a corresponding one of m antennas.

2. The transmitter of claim 1, wherein the baseband transmitting means receives the transmission data having the bandwidth of n multiples of the predetermined bandwidth unit, divides the transmission data on the basis of the predetermined bandwidth unit into the n band signals, and transmits the divided n band signals to the DIF transmitting means by using a very high throughput transmission module of each band.

3. The transmitter of claim 2, wherein the DIF transmitting means includes:
   a plurality of very high throughput reception modules for receiving signals of each band through the very high throughput transmission module;
   a plurality of channel processors for integrating the signals of each band transmitted from the very high throughput reception modules and performing a signal process of complex number modulation and gain control; and
   a plurality of digital-to-analog converters (DAC) for converting and outputting each channel signal respectively outputted from the channel processors into analog signals.

4. A receiver for a high throughput wireless communication system using multiple antennas, comprising:
   a Radio Frequency (RF) receiving means for down-converting each RF signal received through a corresponding one of m antennas into a zero intermediate frequency (IF) signal of zero Hz and outputting the zero IF signals as m channel signals, where m is a predetermined natural number greater than one;
   a digital intermediate frequency (DIF) receiving means for dividing the m channel signals received from the RF receiving means into n band signals where n is a predetermined natural number greater than one, every one of the m channel signals being divided into each one of the n band signals, and each of the n band signals having a bandwidth of a predetermined bandwidth unit; and
   a baseband receiving means for receiving the n band signals from the DIF receiving means and recovering data through a physical layer process, multiple signal detection and channel decoding, the data having a bandwidth of n multiples of the predetermined bandwidth unit.

5. The receiver of claim 4, wherein the baseband receiving means includes:
   a plurality of digital front-ends for synchronizing and recovering zero intermediate frequency (IF) signals of each band received from the DIF receiving means;
   a plurality of a symbol detectors for detecting a symbol through QR decomposition and multidimensional detection on the received signals of each band; and
   a plurality of channel decoders for recovering data by performing channel decoding on the received symbol.

6. The receiver of claim 5, wherein each of the digital front-ends includes:
   a digital amplifier for amplifying the received zero IF signals of each band; and controlling a signal gain by controlling the digital amplifier.

7. The receiver of claim 5, wherein the receiving means includes:
   a plurality of analog-to-digital converter (ADC) for converting the analog signal of each channel received from the RF receiving means into a digital signal;
   a plurality of channel processors for processing and outputting the transmitted signals of each channel; and
   a plurality of very high throughput transmission modules for dividing and outputting the received channel signals into the n band signals.

8. A method for transmitting data in a high throughput wireless communication system using multiple antennas, comprising:
   processing a signal by performing a Media Access Control (MAC) protocol process on transmission data and dividing data into n band signals where n is a predetermined natural number greater than one in a physical layer process, each of the n band signals having a bandwidth of a predetermined bandwidth unit and the transmission data having a bandwidth of n multiples of the predetermined bandwidth unit;
   integrating each of the n band signals and outputting m channel signals where m is a predetermined natural number greater than one, each one of the m channel signals being generated by integrating every one of the n band signals and converting to an analog signal of an intermediate frequency (IF); and
   modulating each of the m channel signals into an RF signal and emitting the RF signal through a corresponding one of m antennas.

9. The method of claim 8, wherein the signal is processed according to each band by dividing the transmission data having the bandwidth of n multiples of the predetermined bandwidth unit into the n band signals on the basis of the predetermined bandwidth unit.

10. A method for receiving data in a high throughput wireless communication system using multiple antennas, comprising:

down-converting a high-frequency signal received through a corresponding one of m antennas into a zero intermediate frequency (IF) signal of zero Hz and outputting the zero IF signals as m channel signals, where m is a predetermined natural number greater than one;

dividing the m channel signals into n band signals where n is a predetermined natural number greater than one, every one of the m channel signals being divided into each one of the n band signals, and each of the n band signals having a bandwidth of a predetermined bandwidth unit; and recovering data by performing a physical layer process, multiple signal detection and channel decoding on the signals of each divided band, the data having a bandwidth of n multiples of the predetermined bandwidth unit.

11. The method of claim 10, wherein amplification and gain control are performed on the signals divided into each band.

12. A method for processing a digital intermediate frequency (DIF) transmission signal for transmission of data in a high throughput wireless communication system using multiple antennas, comprising:

receiving a zero IF signal of each of n bands, where n is a predetermined natural number greater than one, each zero IF signal of n bands having a bandwidth of a predetermined bandwidth unit and the transmission data having a bandwidth of n multiples of the predetermined bandwidth unit and integrating the zero IF signal of each of the n bands to generate m channel signals, each one of the m channel signals being generated by integrating every one of the n band signals and converting to an analog signal of an intermediate frequency (IF);

performing a signal process of complex number modulation and gain control according to each of the m channels where m is a predetermined natural number greater than one, and outputting each channel signal for transmission on a corresponding one of m antennas.

* * * * *